(12) United States Patent
Yoffe

(10) Patent No.: US 8,696,261 B2
(45) Date of Patent: Apr. 15, 2014

(54) CUTTING TOOL ASSEMBLY HAVING A CLAMPING MECHANISM

(75) Inventor: Dov Yoffe, Kiryat Haim (IL)

(73) Assignee: Iscar, Ltd., Tefen (IL)

( * ) Notice: Subject to any disclaimer, the term of this patent is extended or adjusted under 35 U.S.C. 154(b) by 433 days.

(21) Appl. No.: 13/033,303

(22) Filed: Feb. 23, 2011

(65) Prior Publication Data

US 2011/0211923 A1 Sep. 1, 2011

(30) Foreign Application Priority Data

Mar. 1, 2010 (IL) .......................................... 204222

(51) Int. Cl.
*B23B 27/16* (2006.01)

(52) U.S. Cl.
USPC ............ 407/104; 407/106; 407/107; 407/109

(58) Field of Classification Search
USPC ................................................. 407/102–111
See application file for complete search history.

(56) References Cited

U.S. PATENT DOCUMENTS

| | | | | |
|---|---|---|---|---|
| 3,289,272 A | * | 12/1966 | Stier | ............................. 407/104 |
| 3,314,126 A | * | 4/1967 | Stier | ............................. 407/105 |
| 3,355,786 A | | 12/1967 | Hargreaves | |
| 4,697,963 A | * | 10/1987 | Luck | ............................. 407/105 |
| 4,730,525 A | * | 3/1988 | Kelm | ............................... 82/159 |
| 6,158,928 A | * | 12/2000 | Hecht | ........................... 407/102 |
| 2004/0081521 A1 | * | 4/2004 | Erickson | ........................ 407/102 |
| 2006/0291965 A1 | * | 12/2006 | Erickson et al. | ............... 407/102 |
| 2007/0086863 A1 | * | 4/2007 | Tipu | ............................. 407/104 |
| 2007/0116530 A1 | | 5/2007 | Van Horssen | |
| 2007/0196187 A1 | * | 8/2007 | Nelson et al. | .................... 407/91 |
| 2011/0274507 A1 | * | 11/2011 | Park et al. | ...................... 407/104 |

FOREIGN PATENT DOCUMENTS

| | | |
|---|---|---|
| DE | 2149397 A1 | 4/1973 |
| EP | 0161506 A1 | 11/1985 |
| FR | 2107238 A5 | 5/1972 |
| JP | 60 114404 A | 6/1985 |

OTHER PUBLICATIONS

International Search Report dated May 19, 2011 issued in corresponding International Application No. PCT/IL2011/000128.

* cited by examiner

*Primary Examiner* — Andrea Wellington
*Assistant Examiner* — Brendan Ayer
(74) *Attorney, Agent, or Firm* — Womble Carlyle

(57) ABSTRACT

A cutting tool assembly includes a tool body and a clamping mechanism for releasably clamping a cutting insert to the tool body. The clamping mechanism includes a rotatable cam member, a coupling member, a biasing spring and a clamping element. The rotation of the rotatable cam member in opposite senses results in the adjustment of the position of the coupling member in opposite directions, which results in a displacement of the clamping element, and therefore changing the locking position to a releasing position and vice versa.

22 Claims, 13 Drawing Sheets

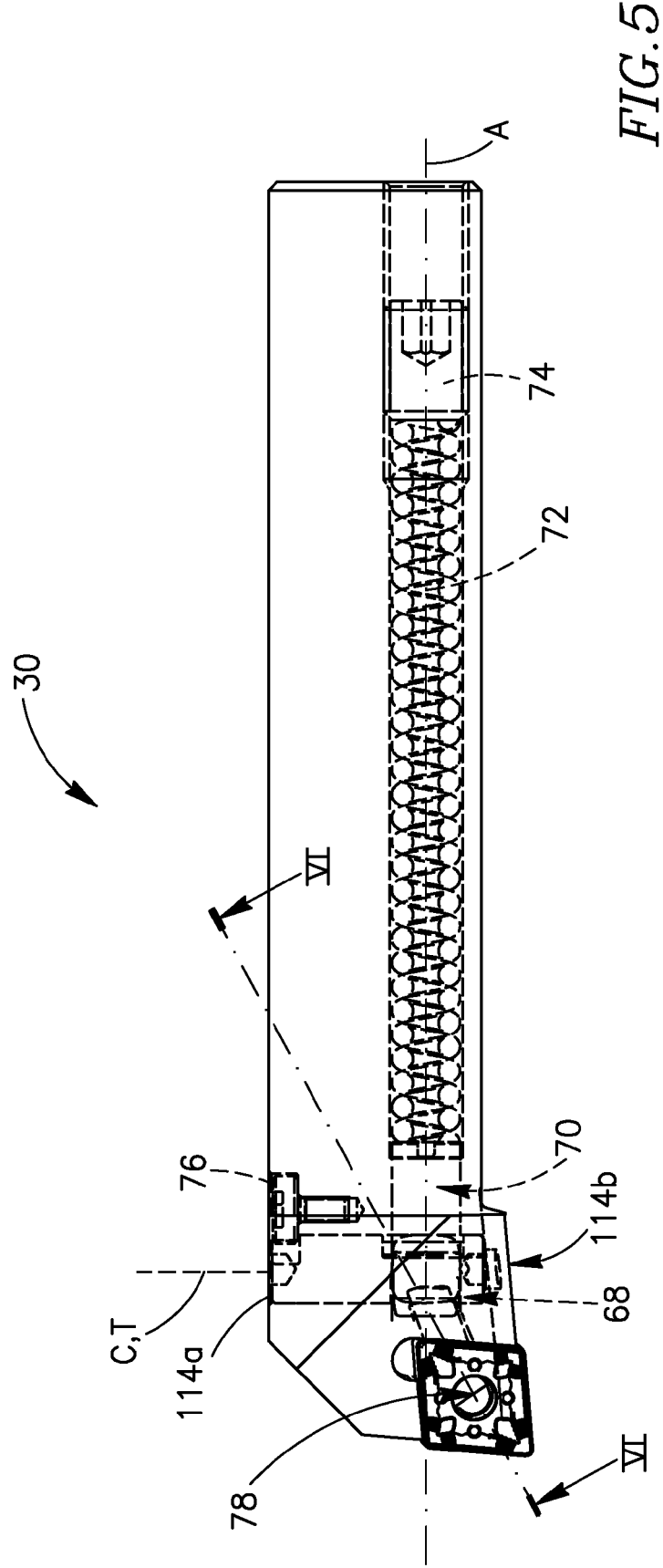

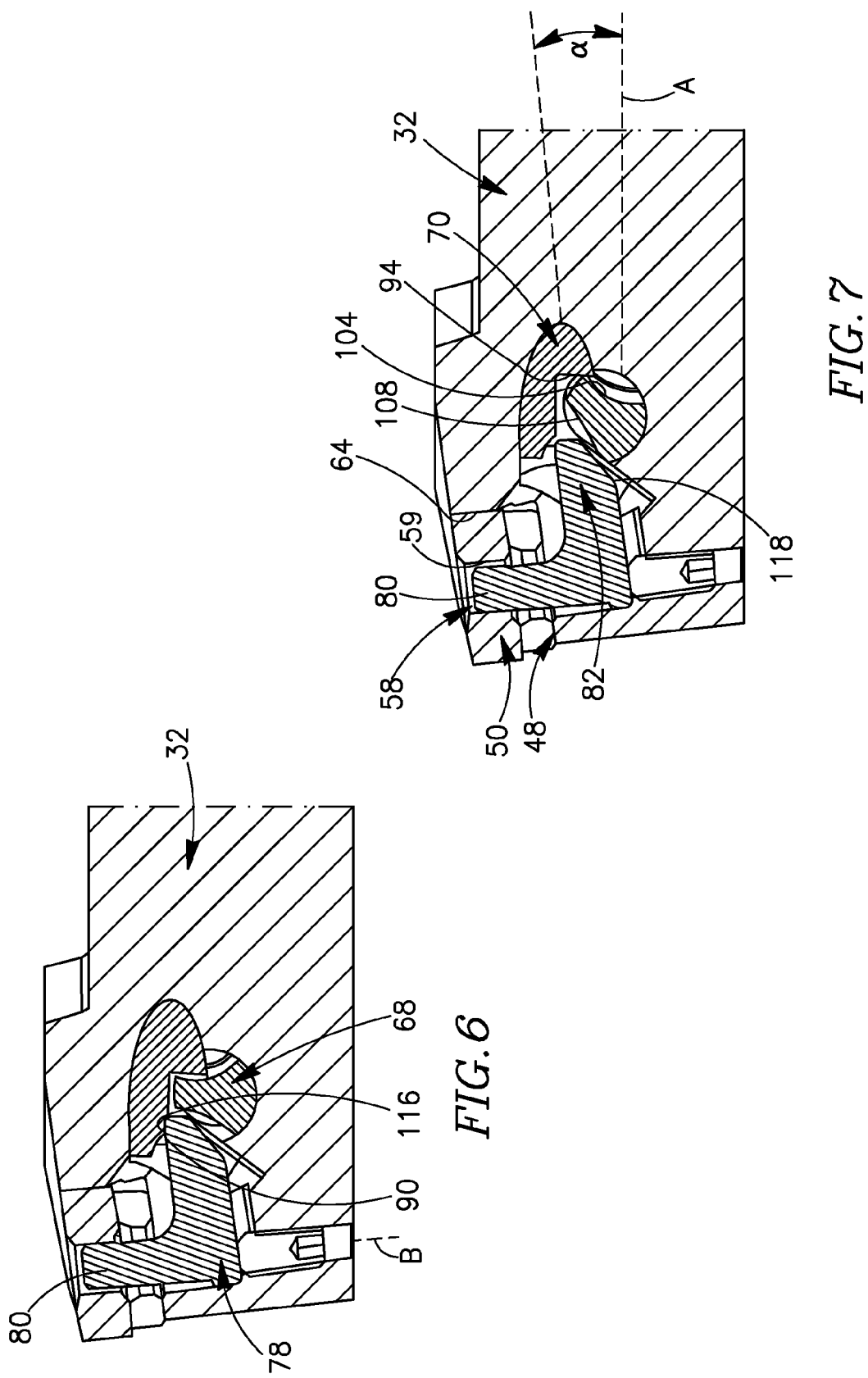

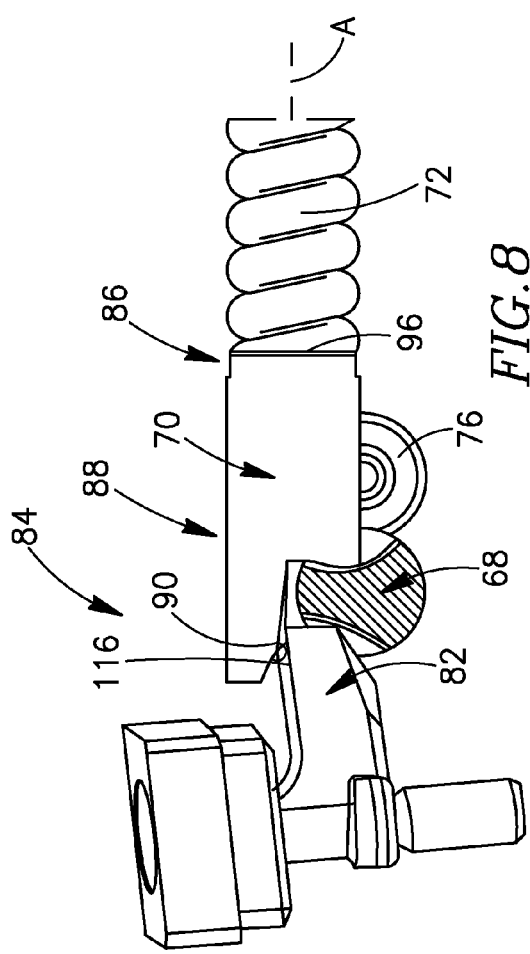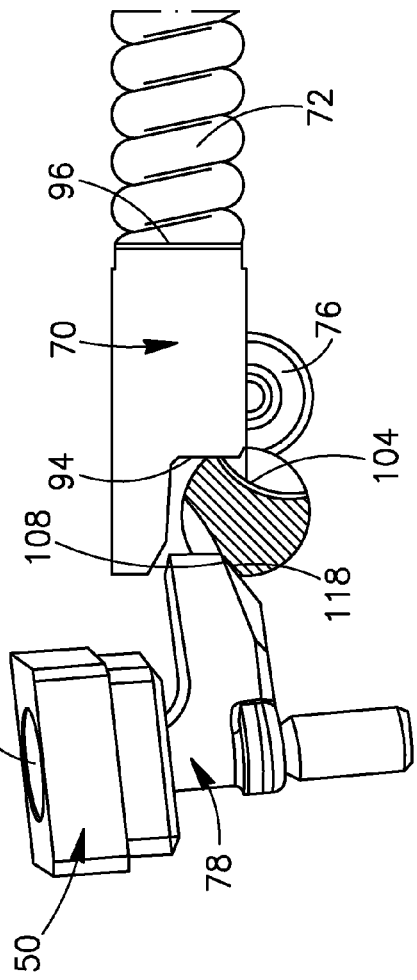

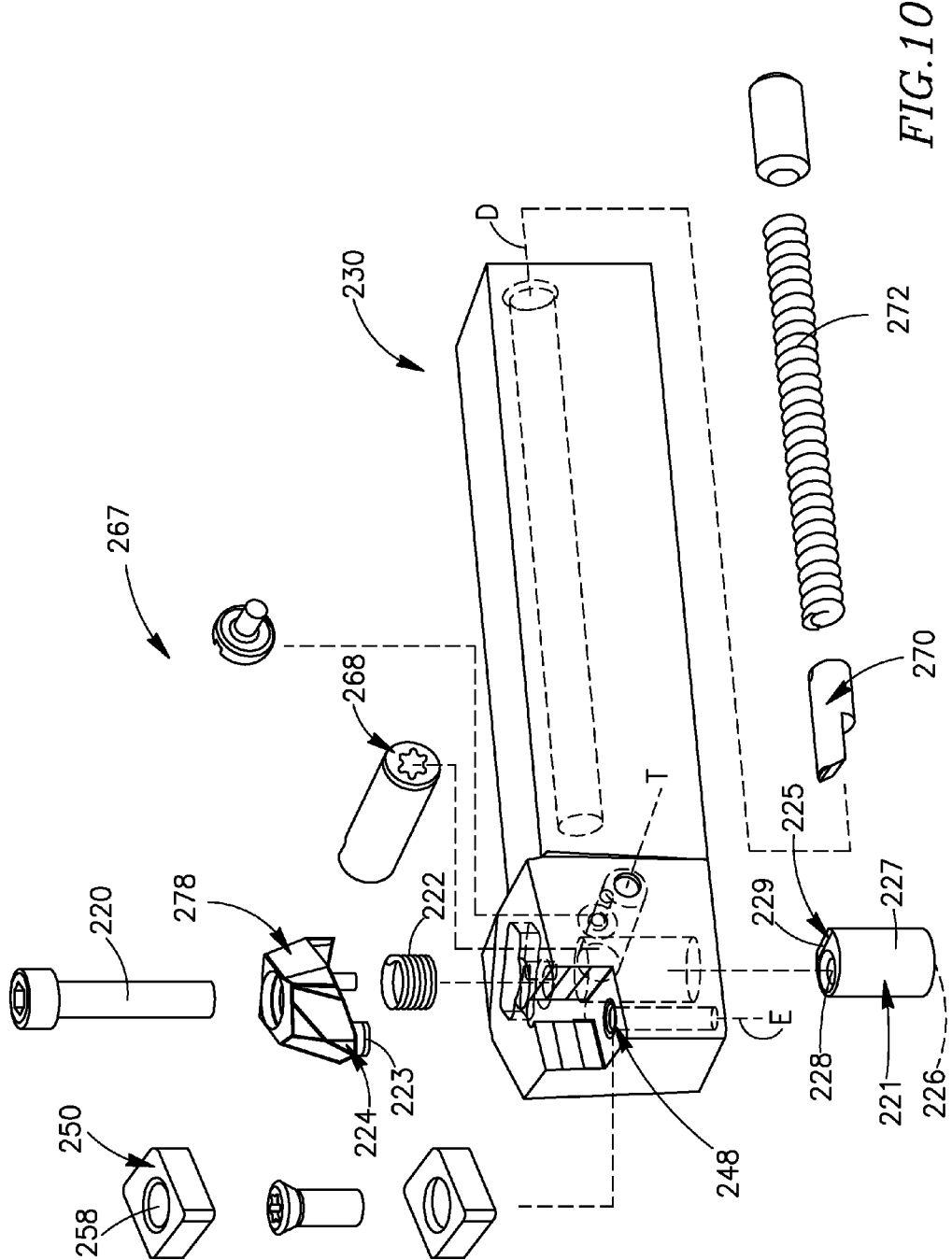

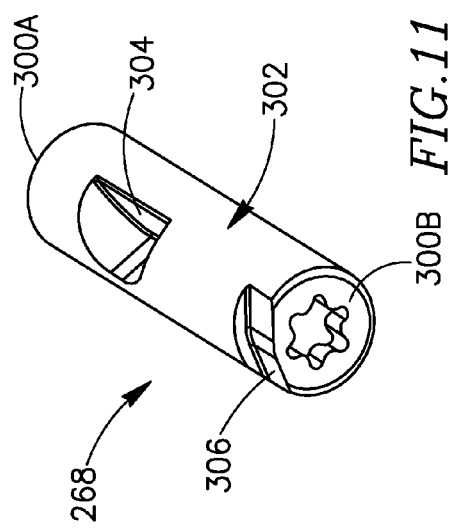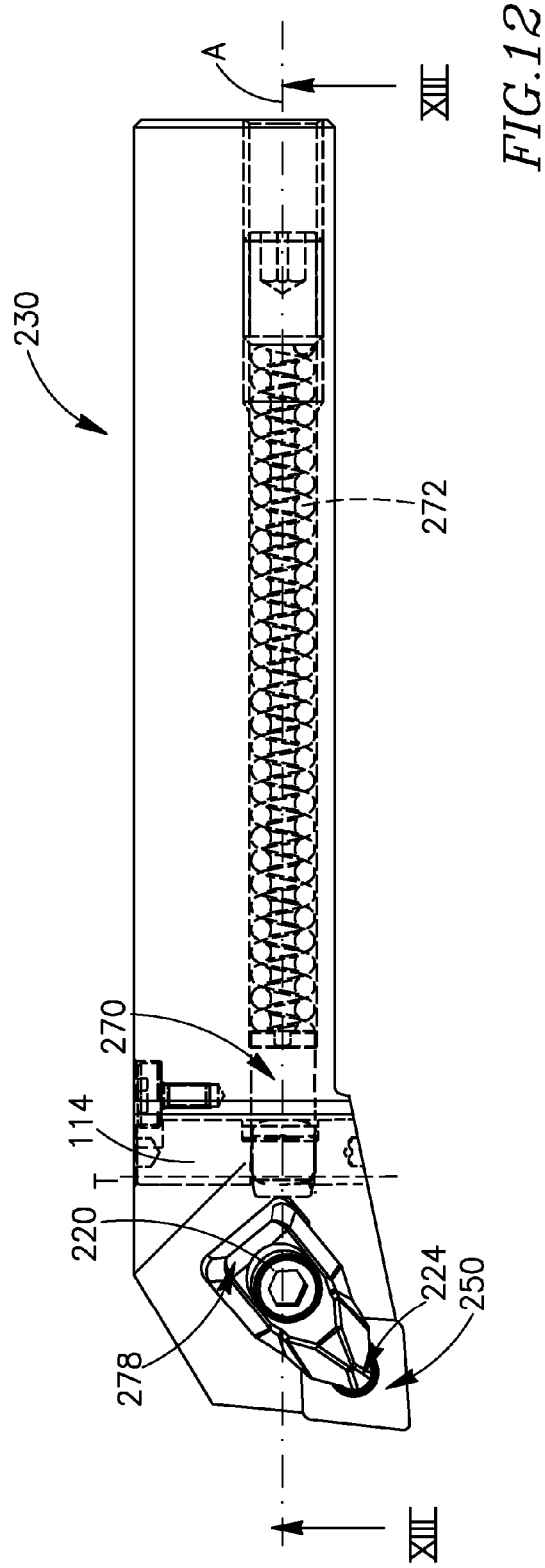

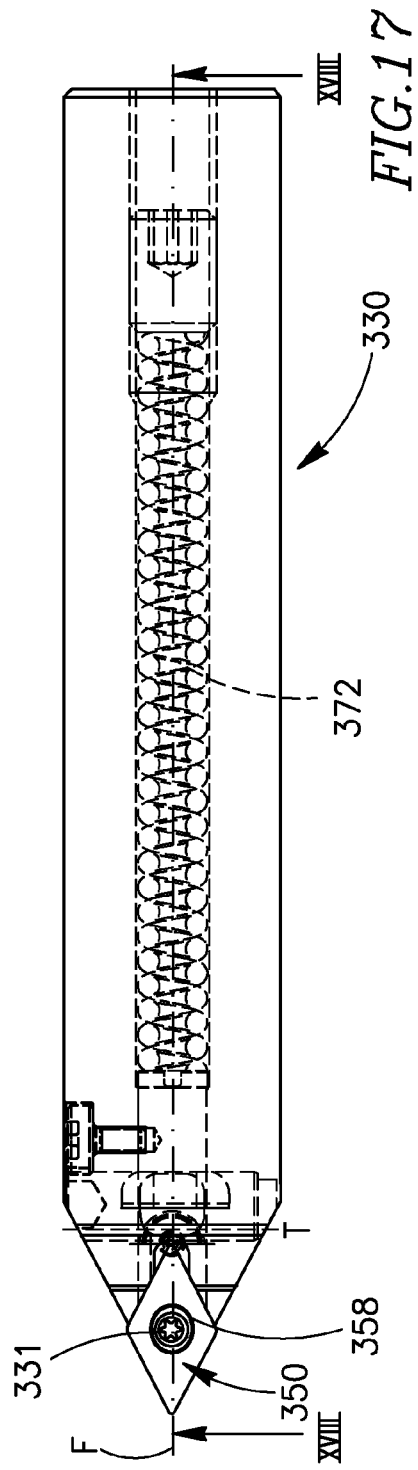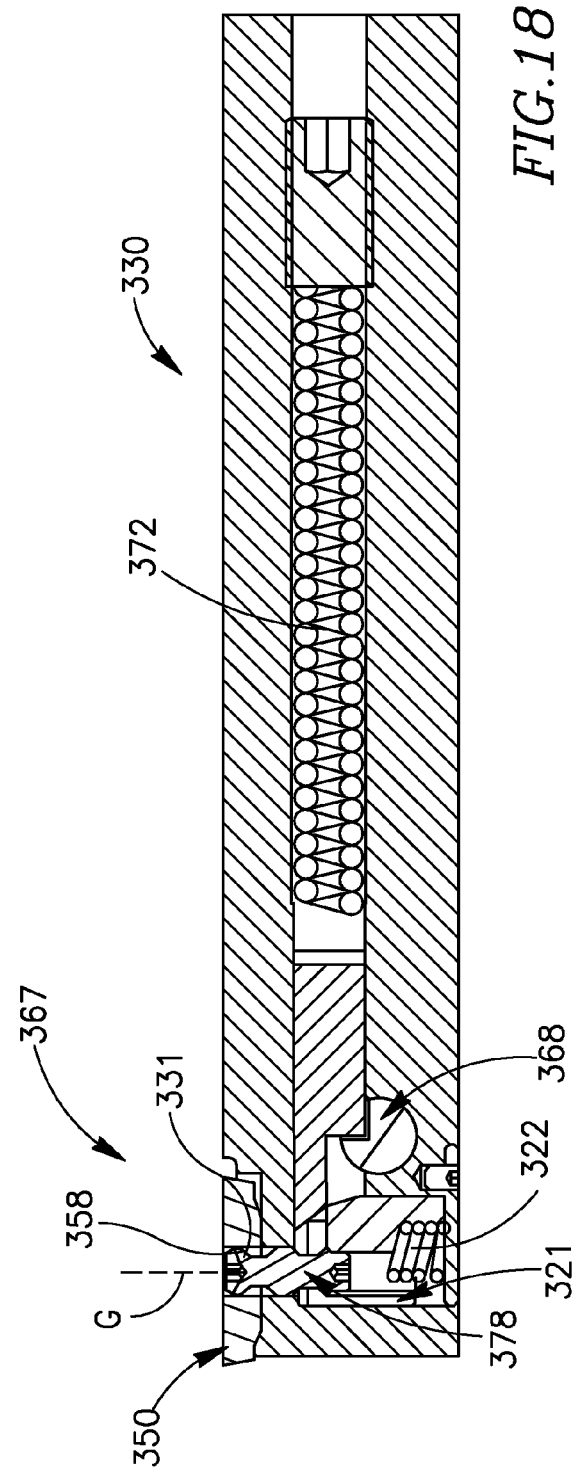

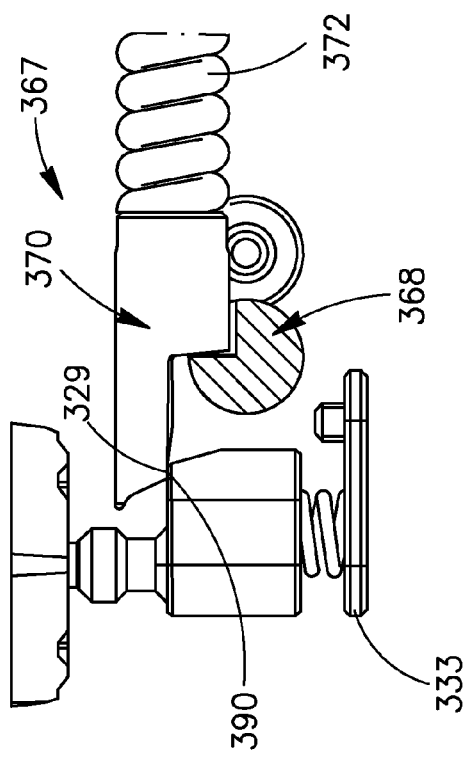
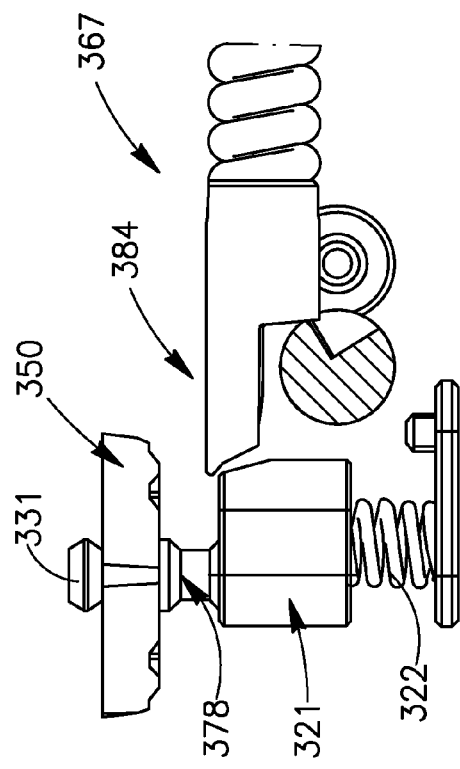

CUTTING TOOL ASSEMBLY HAVING A CLAMPING MECHANISM

FIELD OF THE INVENTION

The present invention relates to a cutting tool assembly comprising of a tool body and a clamping mechanism for releasably clamping a cutting insert to the tool body.

BACKGROUND OF THE INVENTION

Within the field of metal cutting operations using cutting tools with cutting inserts, there are known many different ways for securing a cutting insert to an insert pocket of a cutting tool, such as clamping mechanisms for clamping the cutting insert in the insert pocket. The cutting insert must be replaced with another identical cutting insert or indexed due to wear. The clamping mechanism is released to free up the cutting insert for removal or insertion and applied to firmly hold the cutting insert so that it is ready to use for cutting. These arrangements usually involve a clamping element, such as a clamping screw, a lever, a wedge, or a clamp, and an external member such as a screw to retain or operate the clamping element.

A disadvantage of such a form of clamping is that, in order to replace the cutting insert, it is necessary to remove the external member from its position at the tool machine, or to fully screw or unscrew the external member in order to be able to operate the clamping element. Such a task, of course, is labor and time consuming, and requires additional tools for operating the replacement process.

Attempts have been made to solve some of the above disadvantages, to index or replace the cutting insert quickly and without the need for using any external tools. For example, U.S. Pat. Application No. 20070116530 discloses an end mill having a plurality of quick change insert holders for cutting inserts on machine tools. A clamping arm is movably mounted in an insert housing and has a clamp portion adapted to engage a cutting insert extending over the seat portion. A locking mechanism is contained within the housing and has a clamping position wherein pressing downwardly on the clamp portion of the clamping arm by the user forces the clamp portion to engage the cutting insert and a releasing position wherein pushing a button firmly toward the insert housing forces the clamp portion to disengage from the cutting insert. However, the location of operating the clamp position is different than the location of operating the release position, which impedes the process of the cutting insert replacement, and the clamping force impacted on the locking and releasing elements is determined by the user, creating uncontrolled force which can damage the clamping element.

SUMMARY OF THE INVENTION

In accordance with the present invention there is provided a cutting tool assembly having:

a tool body having a longitudinal axis extending in a forward to rearward direction including a shank portion and a head portion;

the head portion including an insert pocket, the insert pocket having a cutting insert removably secured therein and an insert pocket throughbore;

the insert pocket throughbore having an axis extending in an upward to downward direction generally perpendicular to the tool longitudinal axis;

a rotatable cam member adjacent the head portion having end surfaces and a peripheral surface extending therebetween, with a cam axis of rotation extending along the peripheral surface transverse to the tool longitudinal axis and to the insert pocket throughbore axis;

a biasing spring extending along the tool longitudinal axis;

a coupling member having a central portion abutting a first abutment surface of the rotatable cam member, and a rear portion abutting the biasing spring; and a clamping element. A front portion of the coupling member is operatively connected to the clamping element.

The cutting tool assembly further includes a cam screw that abuts a second abutment surface of the rotatable cam member to prevent the rotatable cam member from exiting the tool body head portion. The first abutment surface of the rotatable cam member is located on the peripheral surface of the rotatable cam member adjacent one of the rotatable cam member end surfaces, and the second abutment surface of the rotatable cam member is located on the rotatable cam member peripheral surface adjacent the opposite end surface of the rotatable cam member.

In accordance with embodiments of the present invention, the first and second abutment surfaces of the rotatable cam member are formed in recesses.

In accordance with embodiments of the present invention, a rotation of the rotatable cam member in a first direction about the cam axis of rotation results in a displacement of the coupling member along the tool longitudinal axis in a direction away from the biasing spring. By virtue of the displacement of the coupling member in a direction away from the biasing spring, the clamping element engages the cutting insert into a locking position.

In accordance with embodiments of the present invention, a rotation of the rotatable cam member in the opposite direction about the cam axis of rotation results in a displacement of the coupling member along the tool longitudinal axis towards the biasing spring. By virtue of the displacement of the coupling member towards the biasing spring, the clamping element disengages the cutting insert into a releasing position to allow removal and replacement of said cutting insert.

In accordance with embodiments of the present invention, the cutting insert has a throughbore having an inner surface, and when the cutting insert is in the locking position, the clamping element is located at least partially in the cutting insert throughbore and applies pressure on the inner surface of the cutting insert throughbore so as to facilitate firm engagement of the cutting insert into the insert pocket.

In accordance with a first embodiment of the present invention, the clamping element is a lever. The lever is L-shape in form and has a lever head portion and a lever end portion, and the insert pocket contains support walls.

In accordance with the first embodiment of the present invention, by virtue of the displacement of the coupling member along the tool longitudinal axis in a direction away from the biasing spring, the lever end portion travel downwardly in a direction parallel to the insert pocket throughbore axis, and the lever head portion is displaced towards the insert pocket support walls through the insert throughbore, engaging the cutting insert into a locking position.

In accordance with the first embodiment of the present invention, by virtue of the displacement of the coupling member along the tool longitudinal axis towards the biasing spring, the head portion of the lever is displaced away from the insert pocket support walls, disengaging the cutting insert into a releasing position to allow removal and replacement of said cutting insert.

In accordance with the first embodiment of the present invention, the tool body contains side surfaces, and the lever end portion is inclined at an acute angle a with respect to the tool longitudinal axis in a plane parallel to the tool body side surfaces.

In accordance with the first embodiment of the present invention, a lower abutment section of the lever end portion abuts a third abutment surface of the rotatable cam member. The third abutment surface of the rotatable cam member is located on the peripheral surface of the rotatable cam member circumferentially spaced from the first abutment surface adjacent one of the rotatable cam member end surfaces. The third abutment surface of the rotatable cam member is formed in a recess.

In accordance with a second embodiment of the present invention, the clamping element is a clamp with a clamp screw accommodated in a screw holder and an ejector spring. By virtue of the displacement of the coupling member along the tool longitudinal axis in a direction away from the biasing spring, the screw holder, and as a result the clamp, the ejector spring and the clamp screw travel downwardly in a direction parallel to the insert pocket throughbore axis, engaging the cutting insert into a locking position.

In accordance with the second embodiment of the present invention, by virtue of the displacement of the coupling member along the tool longitudinal axis towards the biasing spring, the ejector spring is loosened, and the screw holder, the clamp screw and the clamp travel upwardly in a direction parallel to the insert pocket throughbore axis, disengaging the cutting insert into a releasing position to allow removal and replacement of said cutting insert.

In accordance with the second embodiment of the present invention, a protrusion of the clamp is inserted into the cutting insert throughbore in the locking position, and is ejected from the cutting insert throughbore in the releasing position.

In accordance with a third embodiment of the present invention, the clamping element is a securing screw accommodated in a screw holder and an ejector spring. By virtue of the displacement of the coupling member along the tool longitudinal axis in a direction away from the biasing spring, the securing screw holder and as a result the securing screw and the ejector spring travel downwardly in a direction parallel to the insert pocket throughbore axis, engaging the cutting insert into a locking position.

In accordance with the third embodiment of the present invention, by virtue of the displacement of the coupling member along the tool longitudinal axis towards the biasing spring, the ejector spring is loosened, the securing screw holder and the securing screw travel upwardly in a direction parallel to the insert pocket throughbore axis, disengaging the cutting insert into a releasing position to allow removal and replacement of said cutting insert.

BRIEF DESCRIPTION OF THE FIGURES

For a better understanding of the present invention and to show how the same may be carried out in practice, reference will now be made to the accompanying drawings, in which:

FIG. 5 is a top view of the first cutting tool assembly shown in FIG. 1;

FIG. 6 is a cross sectional view taken along the line VI-VI in FIG. 5 with the first cutting tool assembly in a locking position;

FIG. 7 is a cross sectional of the first cutting tool assembly shown in FIG. 6 with the first cutting tool assembly in a releasing position;

FIG. 8 is a side view of a clamping mechanism in a locking position in accordance with the first embodiment of the present invention with the rotatable cam member partially cut away;

FIG. 9 is a side view of the clamping mechanism shown in FIG. 8 in a releasing position;

FIG. 10 is an exploded view of a second cutting tool assembly in accordance with a second embodiment of the present invention;

FIG. 11 is a perspective view of a coupling member in accordance with the second embodiment of the present invention;

FIG. 12 is a top view of the second cutting tool assembly shown in FIG. 10;

FIG. 17 is a top view of the third cutting tool assembly shown in FIG. 16;

FIG. 18 is a cross sectional view taken along the line XVIII-XVIII in FIG. 17;

FIG. 19 is a side view of a clamping mechanism in a locking position in accordance with the third embodiment of the present invention with the rotatable cam member partially cut away; and FIG. 20 is a side view of the clamping mechanism shown in FIG. 19 in a releasing position.

DETAILED DESCRIPTION OF THE PRESENT INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 1:
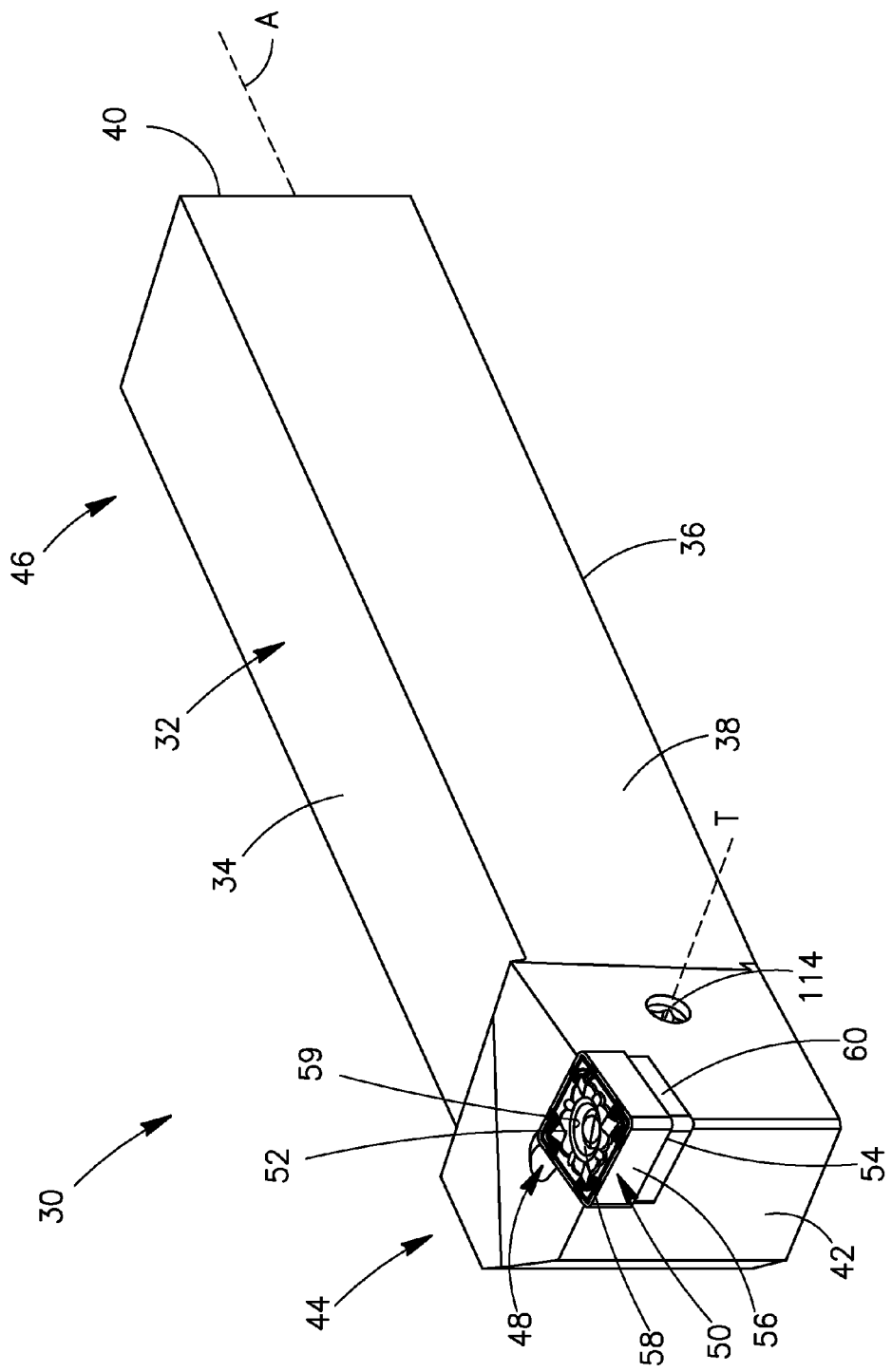
FIG. 1 is a perspective view of a first cutting tool assembly in accordance with a first embodiment of the present invention.
Figure 2:
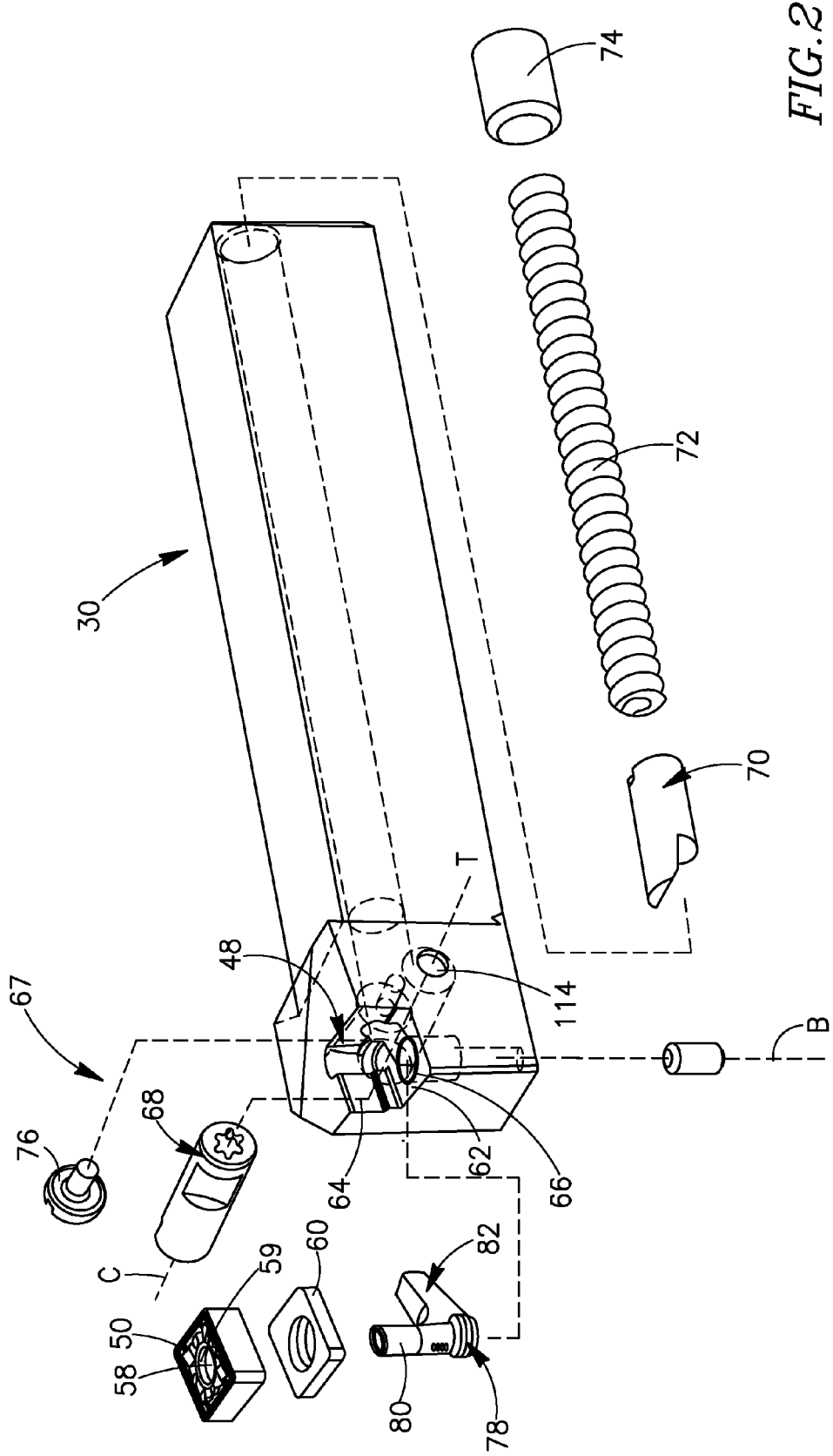
FIG. 2 is an exploded view of the first cutting tool assembly shown in FIG. 1.

Reference is made to FIGS. 1 and 2, showing a first cutting tool assembly 30 in accordance with a first embodiment of the present invention. The first cutting tool assembly 30 may be used for metal cutting operations, such as, for example, turning operations. The first cutting tool assembly 30 includes a tool body 32 having a longitudinal axis A extending in a forward to rearward direction. The tool body 32 may have, as shown, a substantially quadrangular column shape. The tool body 32 has opposing, generally parallel, tool body top and bottom surfaces 34, 36 and tool body side surfaces 38 extending therebetween. Opposing tool body rear and front surfaces 40, 42 extend between the tool body side surfaces 38. The tool body 32 includes a head portion 44 adjacent the front surface 42 and a shank portion 46 extending from the head portion 44 rearwardly towards the rear surface 40. The head portion 44 contains an insert pocket 48, having a cutting insert 50 removably secured therein, adjacent the tool body top surface 34. The cutting insert 50 has opposing cutting insert top and bottom surfaces 52, 54, and a cutting insert peripheral surface 56 extending therebetween. A cutting insert throughbore 58 having an inner surface 59 extends perpendicular to, and opens out to, the cutting insert top and bottom surfaces 52, 54. The cutting insert 50 may be mounted on an insert shim 60, as shown in the figures. The insert pocket 48 contains a base 62 and support walls 64 to retain the cutting insert 50 and to define the location and orientation of the cutting insert 50. An insert pocket throughbore 66 having an insert pocket throughbore axis B extending perpendicular to the base 62 in an upward to downward direction. The insert pocket throughbore axis B may be generally perpendicular to the tool longitudinal axis A.

The first cutting tool assembly 30 has a clamping mechanism 67 having a rotatable cam member 68 adjacent the tool body head portion 44, a coupling member 70 adjacent the rotatable cam member 68, and a biasing spring 72 extending along the tool longitudinal axis A from the coupling member 70 to a biasing spring seat 74. The biasing spring seat 74 is adjacent the tool body rear surface 40, supports the biasing spring 72 and prevents the biasing spring 72 from exiting the tool body 32. A cam screw 76 is located adjacent the rotatable cam member 68 to prevent the rotatable cam member 68 from exiting the tool body head portion 44. The rotatable cam member 68 has a cam axis of rotation C transverse to the tool longitudinal axis A and to the insert pocket throughbore axis B. A clamping element, such as a lever 78 in accordance with the first embodiment of the present invention, is located in the tool body head portion 44. The lever 78 is L-shape in form and has a lever head portion 80 and a lever end portion 82.

Figure 3:
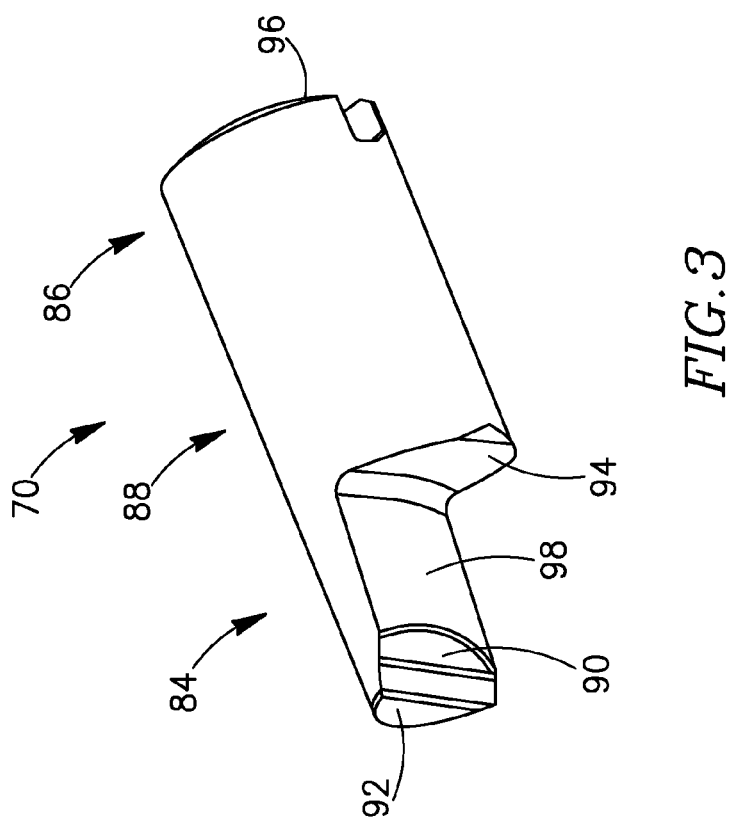
FIG. 3 is a perspective view of a coupling member in accordance with the first embodiment of the present invention.
Figure 13:
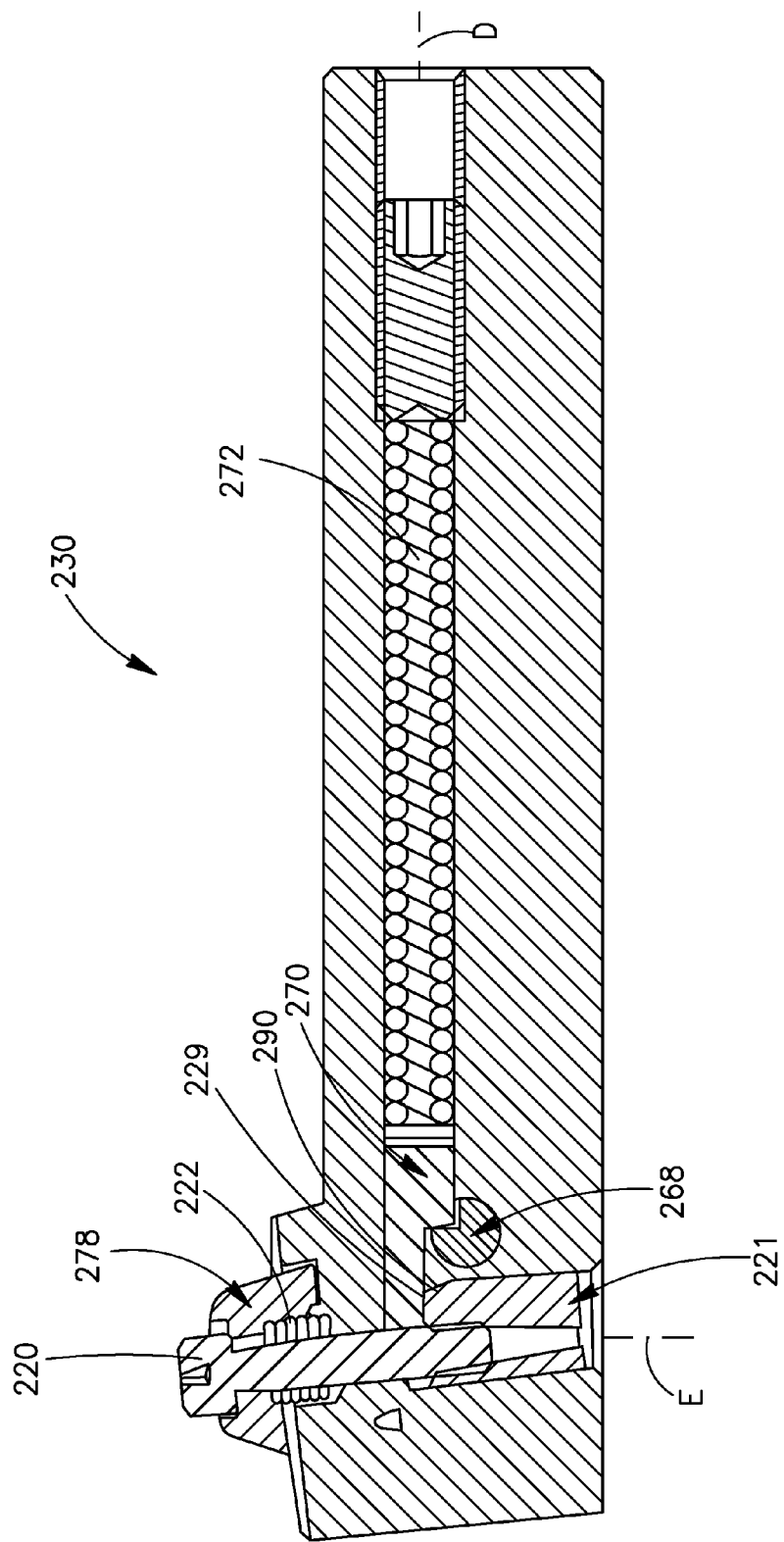
FIG. 13 is a cross sectional view taken along the line XIII-XIII in FIG. 12.
Figure 15:
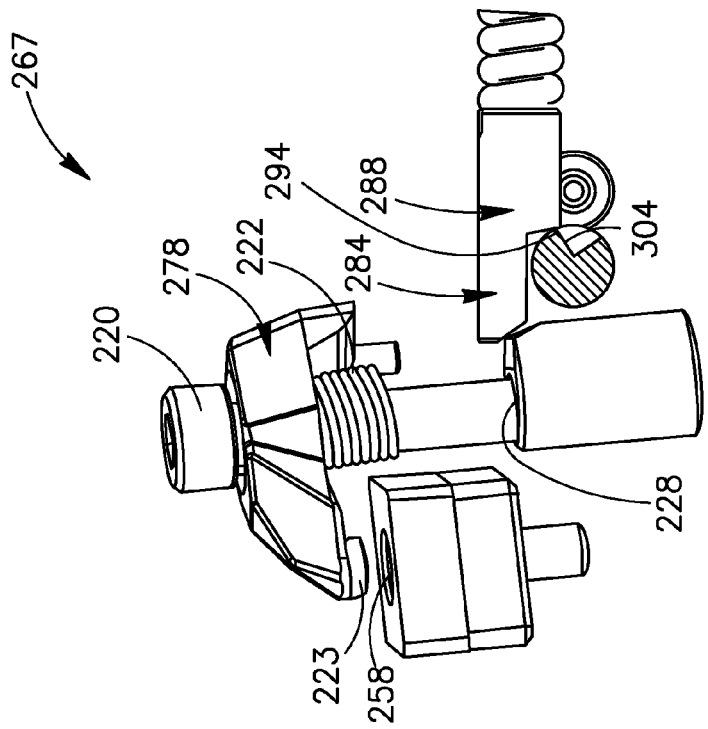
FIG. 15 is a side view of the clamping mechanism shown in FIG. 14 in a releasing position.
Figure 14:
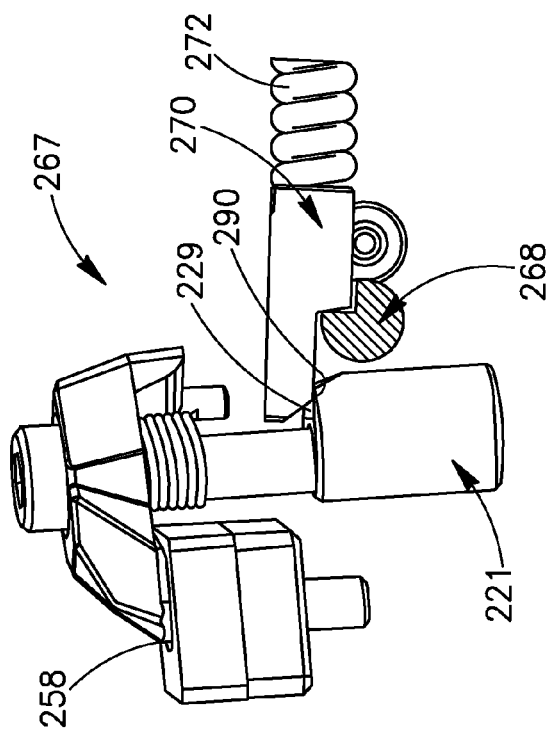
FIG. 14 is a side view of a clamping mechanism in a locking position in accordance with the second embodiment of the present invention with the rotatable cam member partially cut away.
Figure 16:
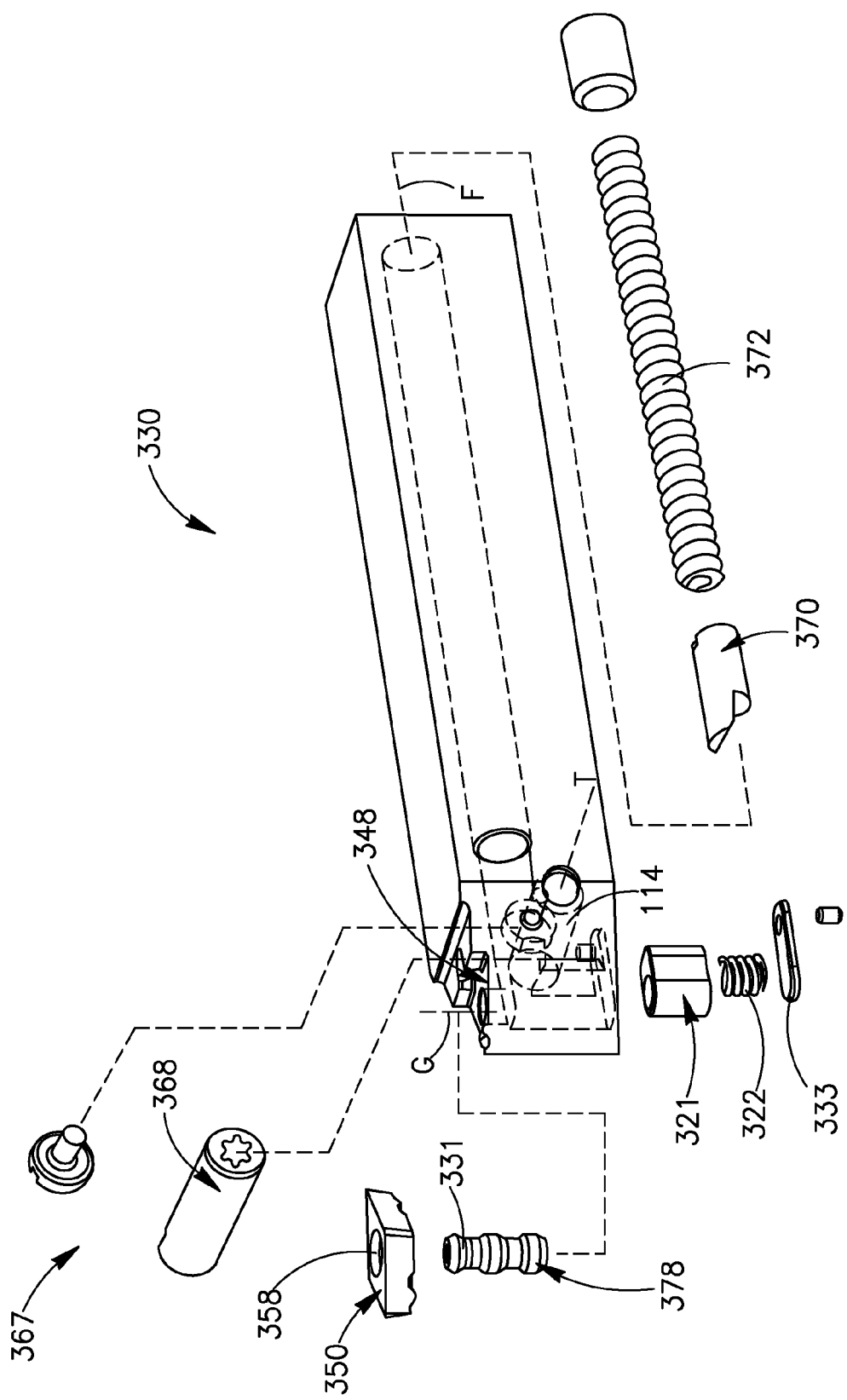
FIG. 16 is an exploded view of a third cutting tool assembly in accordance with a third embodiment of the present invention.

As can be seen in FIG. 3, the coupling member 70 has a front portion 84, a rear portion 86 and a central portion 88 extending therebetween. The front portion 84 has a front portion abutment surface 90 adjacent a front end 92 of the coupling member 70. The central portion 88 has a central portion abutment surface 94 adjacent the front portion 84 and the rear portion 86 has a rear portion abutment surface 96 distal the front portion abutment surface 90. The central portion and rear portion abutment surfaces 94, 96 may face in opposite directions. The front portion 84 has a relief surface 98 located between the central portion abutment surface 94 and the front portion abutment surface 90. The coupling member 70 has a generally cylindrical shape partially cut away at the front end 92 to form the front portion 84, so that the relief surface 98 and the central portion abutment surface 94 form an L-shape structure.

Figure 4:
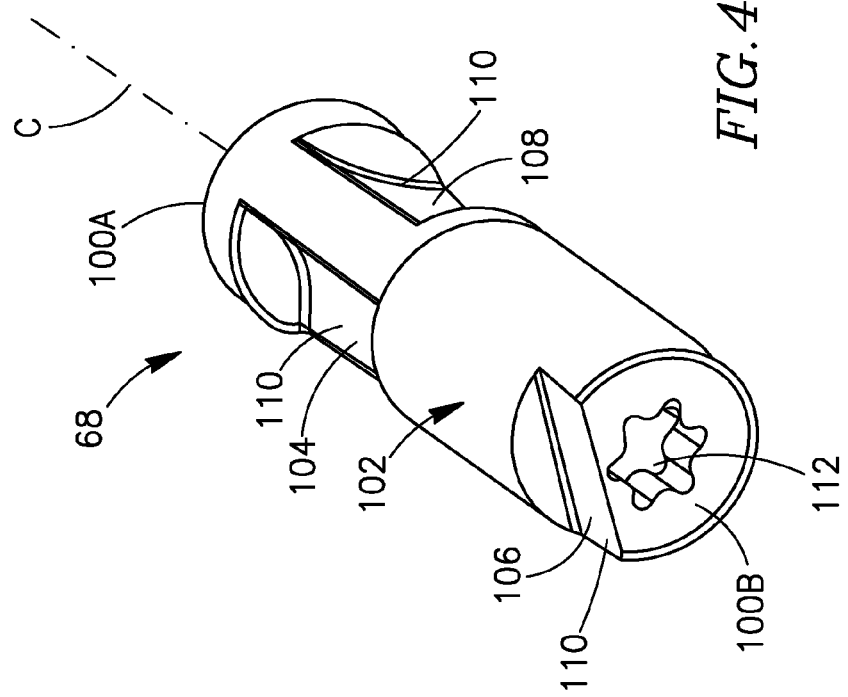
FIG. 4 is a perspective view of a rotatable cam member in accordance with the first embodiment of the present invention.

Attention is now turned to FIG. 4. The rotatable cam member 68 has a generally cylindrical shape, having opposing end surfaces 100A, 100B and a peripheral surface 102 extending therebetween. The rotatable cam member peripheral surface 102 includes three abutment surfaces 104, 106, 108 formed in recesses 110 in the peripheral surface 102. First and third abutment surfaces 104, 108 are located adjacent, but not opening out to, one rotatable cam member end surface 100A, and a second abutment surface 106 is located adjacent, and opens out to, the opposite rotatable cam member end surface 100B. The first and third abutment surfaces 104, 108 are concave and face in generally opposite directions. The second abutment surface 106 may be planar and may face generally in the same direction as one of the first and third abutment surfaces 104, 108. Each one of the rotatable cam member end surfaces 100A, 100B has a recess 112 for receiving a handle or a screw driver (not shown) for rotating the rotatable cam member 68.

As best seen in FIG. 5, a through-hole 114 has opposite ends provided with through-hole openings 114a, 114b which open out on opposite sides of the head portion 44. In some embodiments, the through-hole openings 114a, 114b open out on opposing tool body side surfaces 38. The through-hole 114 has a through-hole axis T which is transverse to the tool body longitudinal axis A. The through-hole 114 accommodates the rotatable cam member 68 which is inserted thereinto via the first through-hole opening 114a provided on the same side surface as the cam screw 76. The rotatable cam member end surfaces 100A, 100B are generally accessible via the through-hole openings 114a, 114b. Thus, at least in some embodiments, the rotatable cam member 68 is capable of being rotated from either end of the through-hole 114 to place the cutting insert in either the locking or releasing position, by insertion of a handle or a screw driver into the through-hole openings 114a, 114b.

Attention is now drawn to FIGS. 5 to 9 showing the first cutting tool assembly 30 in locking and releasing positions. The lever end portion 82 is inclined at an acute angle $\alpha$ with respect to the tool longitudinal axis A in a plane parallel to the tool body side surfaces 38. In both the locking and releasing positions, the rear portion abutment surface 96 of the coupling member rear portion 86 abuts the biasing spring 72, and the second abutment surface 106 of the rotatable cam member 68 abuts the cam screw 76. In the locking position, the front portion abutment surface 90 of the coupling member front portion 84 abuts an upper part 116 of the lever end portion 82. In the releasing position, the central portion abutment surface 94 of the coupling member central portion 88 abuts the first abutment surface 104 of the rotatable cam member 68, and the third abutment surface 108 of the rotatable cam member 68 might abut a lower abutment section 118 of the lever end portion 82.

In accordance with the first embodiment of the present invention, a displacement of the clamping element, such as the lever 78, and consequently transferring the clamping mechanism 67 from the releasing to the locking position and vice versa, is achieved by rotation of the rotatable cam member 68 about the cam axis of rotation C.

To change from the releasing position to the locking position, the rotatable cam member 68 is rotated by the handle or the screwdriver in one direction, or in one sense, about the cam axis of rotation C, and therefore, the rotatable cam member first abutment surface 104, which is rotated in the same direction, disengages the central portion abutment surface 94 of the coupling member central portion 88. As a consequence, a force applied on the biasing spring 72 is released, which causes a displacement of the coupling member 70 along the tool longitudinal axis A in a direction away from the biasing spring 72. By virtue of the displacement of the coupling member 70 in a direction away from the biasing spring 72, the lever end portion 82 is pushed downwardly and thus travels in a direction parallel to the insert pocket throughbore axis B via a force applied by the front portion abutment surface 90 of the coupling member front portion 84 on the upper part 116 of the lever end portion 82. As a consequence, the lever head portion 80 is displaced towards the insert pocket support walls 64 through the insert throughbore 58, securing the cutting insert 50 in the insert pocket 48 and thereby engaging the cutting insert 50 into the locking position.

To change back from the locking position to the releasing position, the rotatable cam member 68 is rotated in the opposite direction, or opposite sense, about the cam axis of rotation C, and therefore, the rotatable cam member first abutment surface 104, which is rotated in the same direction, pushes the central portion abutment surface 94 of the coupling member central portion and causes a displacement of the coupling member 70 along the tool longitudinal axis A in a direction towards the biasing spring 72. By virtue of the displacement of the coupling member 70 in a direction towards the biasing spring 72, the force applied by the front portion abutment surface 90 of the coupling member front portion 84 on the upper part 116 of the lever end portion 82 is reduced, and the lever end portion 82 is free to move between the front portion abutment surface 90 of the coupling member front portion 84 and the rotatable cam member third abutment surface 108. Due to the inclination of the lever end portion 82 and the "L" shape of the lever 78, the lever end portion 82 tends to return the lever 78 to the original state that it was in before the force was applied, which is upwardly in a direction parallel to the insert pocket throughbore axis B. As a consequence, the lever head portion 80 is displaced away from the insert pocket support walls 64, free to move within the insert throughbore 58, disengaging the cutting insert 50 into a releasing position to allow removal and replacement of said cutting insert 50.

Attention is now drawn to FIGS. 10 to 15 showing a cutting tool assembly, referred to hereinbelow as the second cutting tool assembly 230, in accordance with a second embodiment of the present invention. Since the second cutting tool assembly 230 has many features which are similar to those of the first cutting tool assembly 30, the similar features of the cutting tool assembly will be referred to herein below by reference numerals which are shifted by 200 from those of the first cutting tool assembly 30, and only the different features will be described.

In the second embodiment, a clamping mechanism 267 is provided, and the clamping element is a clamp 278 with a clamp screw 220 accommodated in a screw holder 221 and an ejector spring 222. The clamp screw 220 is threaded into the screw holder 221 through the clamp 278 and the ejector spring 222. The ejector spring 222 is located between the clamp 278 and the screw holder 221. The clamp 278 has a protrusion 223 in a front part 224 of the clamp 278. The screw holder 221 has a generally cylindrical shape, with top and bottom surfaces 225, 226, a screw holder peripheral surface 227 extending therebetween, and a screw holder throughbore 228 extending perpendicular to the screw holder top and bottom surfaces 225, 226 to accommodate the clamp screw 220. The screw holder top surface 225 has an abutment portion 229.

In accordance with the second embodiment of the present invention, the clamping mechanism 267 includes a rotatable cam member 268 as shown in FIG. 11, a coupling member 270, and a biasing spring 272. The rotatable cam member 268 includes a rotatable cam member peripheral surface 302 having two abutment surfaces 304, 306, first abutment surface 304 is adjacent a rotatable cam member first end surface 300A, and a second abutment surface 306 is adjacent an opposite rotatable cam member second end surface 300B and extends therefrom inwardly.

The second cutting tool assembly 230 has a tool longitudinal axis D and contains an insert pocket 248 having a cutting insert 250 removably secured therein and an insert pocket throughbore axis E. The cutting insert 250 has a cutting insert throughbore 258.

The second cutting tool assembly 230 in locking and releasing positions can be seen in FIGS. 12 to 15. In the locking position, a front portion abutment surface 290 of a front portion 284 of the coupling member 270 abuts the abutment portion of the screw holder top surface 229. In the releasing position, a central portion abutment surface 294 of a central portion 288 of the coupling member 270 abuts the first abutment surface 304 of the rotatable cam member 268.

To change from the releasing position to the locking position, the rotatable cam member 268 of the second embodiment is rotated in the same manner as the rotatable cam member 68 of the first embodiment, causing a displacement of the coupling member 270 along the tool longitudinal axis D in a direction away from the biasing spring 272. By virtue of the displacement of the coupling member 270 in a direction away from the biasing spring 272, the screw holder 221, and as a result the clamp 278, the ejector spring 222 and the clamp screw 220 are pushed downwardly and thus travel in a direction parallel to the insert pocket throughbore axis E via a force applied by the front portion abutment surface 290 of the coupling member front portion 284 on the screw holder top surface abutment portion 229. The applied force compresses the ejector spring 222 between the underside of the clamp 278 and a base of a clamp recess (not shown). As a consequence of this force, the protrusion 223 of the clamp 278 is inserted into the cutting insert throughbore 258, securing the cutting insert 250 in the insert pocket 248 and thereby engaging the cutting insert 250 into the locking position.

To change back from the locking position to the releasing position, the rotation of the rotatable cam member 268 in the opposite direction causes a displacement of the coupling member 270 along the tool longitudinal axis D in a direction towards the biasing spring 272. By virtue of the displacement of the coupling member 270 towards the biasing spring 272, the force applied by the front portion abutment surface 290 of the coupling member front portion 284 on the screw holder top surface abutment portion 229 is loosened, and therefore the ejector spring 222 is loosened. As a consequence, the screw holder 221, the clamp screw 220 and the clamp 278 are pushed upwardly and thus travel in a direction parallel to the insert pocket throughbore axis E, ejecting the clamp protrusion 223 from the insert throughbore 258, therefore disengaging the cutting insert 250 into a releasing position to allow removal and replacement of said cutting insert 250.

Attention is now drawn to FIGS. 16 to 20 showing a cutting tool assembly 330, referred to hereinbelow as the third cutting tool assembly, in accordance with a third embodiment of the present invention. Since the third cutting tool assembly 330 has many features which are similar to those of the first and second cutting tool assemblies 30, 230, the similar features of the cutting tool assembly will be referred to herein below by reference numerals which are shifted by 100 from those of the second cutting tool assembly 230, and only the different features will be described.

In the third embodiment, a clamping mechanism 367 is provided, and the clamping element is a securing screw 378 accommodated in a securing screw holder 321 and an ejector spring 322. The securing screw 378 includes a securing screw head 331. The ejector spring 322 is located between the securing screw holder 321 and an ejector spring seat 333. Thus, unlike in the second embodiment disclosed above, in this third embodiment, the ejector spring 322 is positioned below the securing screw holder 321 and away from the securing screw 378 rather than between the two. The third cutting tool assembly 330 has a tool longitudinal axis F and contains an insert pocket 348 having a cutting insert 350 removably secured therein and an insert pocket throughbore axis G. The cutting insert 350 may have an oval cutting insert throughbore 358, in order to enable the removal of the cutting insert 350 without the need to screw or unscrew the securing screw 378. Alternatively, the screw head 331 may have a suitable shape that enables the removal of the cutting insert 350 without the need to remove the securing screw 378.

The operation of the clamping mechanism 367 of the third embodiment is very similar to the clamping mechanism 267 of the second embodiment. To change from the releasing position to the locking position, the rotation of a rotatable cam member 368 in one direction, which causes a displacement of a coupling member 370 along the tool longitudinal axis F in a direction away from a biasing spring 372, causes a force applied by a front portion abutment surface 390 of a coupling member front portion 384 on a screw holder top surface abutment portion 329, to push the securing screw holder 321, the securing screw 378 and the ejector spring 322 downwardly in a direction of the insert pocket throughbore axis G. The applied force compresses the ejector spring 322 between the securing screw holder 321 and the ejector spring seat 333. As a consequence of this force, the securing screw head 331 is inserted into the insert throughbore 358, securing the cutting insert 350 in the insert pocket 348 and thereby engaging the cutting insert 350 into the locking position.

To change back from the locking position to the releasing position, the rotation of the rotatable cam member 368 in the opposite direction causes a displacement of the coupling member 370 along the tool longitudinal axis F in a direction towards the biasing spring 372. By virtue of the displacement of the coupling member 370 towards the biasing spring 372, the force applied by the front portion abutment surface 390 of the coupling member front portion 384 on the screw holder top surface abutment portion 329 is loosened, and therefore the ejector spring 322 is loosened. As a consequence, the securing screw holder 321 and the securing screw 378 are pushed upwardly and thus travel in the direction of the insert pocket throughbore axis G, ejecting the screw head 331 from the insert throughbore 358, and therefore disengaging the cutting insert 350 into a releasing position to allow removal and replacement of said cutting insert 350.

The clamping mechanism 67, 267, 367 is bidirectional. The rotatable cam member 68, 268, 368 can either be rotated in a direction towards the biasing spring 72, 272, 372 or in a second direction away from the biasing spring 72, 272, 372. In other words, rotation of the rotatable cam member 68, 268, 368 in opposite senses about the rotatable cam member axis C results in the adjustment of the position of the coupling member 70, 270, 370 in opposite directions (i.e., bidirectional) along the tool longitudinal axis A, D, F, or in general, in a direction transverse to the rotatable cam member axis C, which results in a displacement of the clamping element 78, 278, 378, and therefore changing the locking position to a releasing position and vice versa.

It will be appreciated that the present invention not only provides a particularly efficient and firm way of retaining the cutting insert 50, 250, 350, in accordance with the embodiments of the present invention, but at the same time facilitates a quick and comfortable way of removing and replacing the cutting insert 50, 250, 350 by a measured and controlled force which allows the use of only one required access to operate the locking mechanism 67, 267, 367 without the need to have accesses from multiple directions or sides which complicates the removal operation. Even so, since an operator may access and rotate the rotatable cam member 68, 268, 368 from either opening 114a, 114b of the through-hole 114, there is increased flexibility in replacing a cutting insert.

Although the present invention has been described to a certain degree of particularity, it should be understood that various alterations and modifications could be made without departing from the scope of the invention as hereinafter claimed.

What is claimed is:

1. A cutting tool assembly (30, 230, 330) comprising:
a tool body (32) having a tool longitudinal axis (A, D, F) extending in a forward to rearward direction comprising a shank portion (46) and a head portion (44);
the head portion (44) comprising an insert pocket (48, 248, 348), the insert pocket having a cutting insert (50, 250, 350) removably secured therein and an insert pocket throughbore (66);
the insert pocket throughbore (66) having an insert pocket throughbore axis (B, E, G) extending in an upward to downward direction generally perpendicular to the tool longitudinal axis (A, D, F);
a rotatable cam member (68, 268, 368) adjacent the head portion (44) having end surfaces (100A, 100B, 300A, 300B) and a peripheral surface (102, 302) extending therebetween, with a cam axis of rotation (C) extending along the peripheral surface (102, 302) transverse to the tool longitudinal axis (A, D, F) and to the insert pocket throughbore axis (B, E, G);
a biasing spring (72, 272, 372) extending along the tool longitudinal axis (A, D, F);
a coupling member (70, 270, 370) having a central portion (88, 288) abutting a first abutment surface (104, 304) of the rotatable cam member (68, 268, 368), and a rear portion (86) abutting the biasing spring (72, 272, 372);
a clamping element (78, 278, 378);
wherein rotation of the rotatable cam member (68, 268, 368) in a first direction about the cam axis of rotation (C) results in a displacement of the coupling member (70, 270, 370) along the tool longitudinal axis (A, D, F) in a direction away from the biasing spring (72, 272, 372);
wherein by virtue of the displacement of the coupling member (70, 270, 370) in a direction away from the biasing spring (72, 272, 372), the clamping element (78, 278, 378) engages the cutting insert (50, 250, 350) into a locking position; and
wherein rotation of the rotatable cam member (68, 268, 368) in an opposite second direction about the cam axis of rotation (C) results in a displacement of the coupling member (70, 270, 370) along the tool longitudinal axis (A, D, F) towards the biasing spring (72, 272, 372);
wherein by virtue of the displacement of the coupling member (70, 270, 370) towards the biasing spring (72, 272, 372), the clamping element (78, 278, 378) disengages the cutting insert (50, 250, 350) into a releasing position to allow removal and replacement of said cutting insert (50, 250, 350).

2. The cutting tool assembly (30, 230, 330) according to claim 1, wherein a front portion (84, 284, 384) of the coupling member (70, 270, 370) is operatively connected to the clamping element (78, 278, 378).

3. The cutting tool assembly (30, 230, 330) according to claim 1, wherein the cutting tool assembly (30, 230, 330) comprises a cam screw (76) that abuts a second abutment surface (106, 306) of the rotatable cam member (68, 268, 368) to prevent the rotatable cam member (68, 268, 368) from exiting the tool body head portion (44).

4. The cutting tool assembly (30, 230, 330) according to claim 3, wherein the first abutment surface (104, 304) of the rotatable cam member (68, 268, 368) is located on the peripheral surface (102, 302) of the rotatable cam member (68, 268, 368) adjacent one of the rotatable cam member end surfaces (100A, 300A), and the second abutment surface (106, 306) of the rotatable cam member (68, 268, 368) is located on the rotatable cam member peripheral surface (102, 302) adjacent the opposite end surface (100B, 300B) of the rotatable cam member (68, 268, 368).

5. The cutting tool assembly (30, 230, 330) according to claim 4, wherein the first and second abutment surfaces (104, 304, 106, 306) of the rotatable cam member (68, 268, 368) are formed in recesses (110).

6. The cutting tool assembly (30, 230, 330) according to claim 1, wherein the cutting insert (50, 250, 350) comprises a throughbore (58, 258, 358) having an inner surface (59), and wherein, when the cutting insert (50, 250, 350) is in the locking position, the clamping element (78, 278, 378) is located at least partially in the cutting insert throughbore (58, 258, 358) and applies pressure on the inner surface (59) of the cutting insert throughbore (58, 258, 358) so as to facilitate firm engagement of the cutting insert (50, 250, 350) into the insert pocket (48, 248, 348).

7. The cutting tool assembly (30) according to claim 6, wherein the clamping element is a lever (78).

8. The cutting tool assembly (30) according to claim 7, wherein the lever (78) is L-shape in form and comprises a lever head portion (80) and a lever end portion (82), and the insert pocket (48) comprises support walls (64);
wherein by virtue of the displacement of the coupling member (70) along the tool longitudinal axis (A) in a direction away from the biasing spring (72), the lever end portion (82) travels downwardly in a direction parallel to the insert pocket throughbore axis (B), and the lever head portion (80) is displaced towards the insert pocket support walls (64) through the insert throughbore (58), engaging the cutting insert (50) into a locking position; and
wherein by virtue of the displacement of the coupling member (70) along the tool longitudinal axis (A) towards the biasing spring (72), the head portion of the lever (78) is displaced away from the insert pocket support walls (64), disengaging the cutting insert (50) into a releasing position to allow removal and replacement of said cutting insert (50).

9. The cutting tool assembly (30) according to claim 8, wherein the tool body (32) comprises side surfaces (38), and wherein the lever end portion (82) is inclined at an acute angle ($\alpha$) with respect to the tool longitudinal axis (A) in a plane parallel to the tool body side surfaces (32).

10. The cutting tool assembly (30) according to claim 8, wherein a lower abutment section (118) of the lever end portion (82) abuts a third abutment surface (108) of the rotatable cam member (68).

11. The cutting tool assembly (30) according to claim 10, wherein the third abutment surface (108) of the rotatable cam member (68) is located on the peripheral surface (102) of the rotatable cam member (68) circumferentially spaced from the first abutment surface (104) adjacent one of the rotatable cam member end surfaces (100A).

12. The cutting tool assembly (30) according to claim 11, wherein the third abutment surface (108) of the rotatable cam member (68) is formed in a recess (110).

13. The cutting tool assembly (230) according to claim 6, wherein the clamping element is a clamp (278) with a clamp screw (220) accommodated in a screw holder (221) and an ejector spring (222).

14. The cutting tool assembly (230) according to claim 13, wherein by virtue of the displacement of the coupling member (270) along the tool longitudinal axis (D) in a direction away from the biasing spring (272), the screw holder (221), and as a result the clamp (278), the ejector spring (222) and the clamp screw (220) travel downwardly in a direction parallel to the insert pocket throughbore axis (E), engaging the cutting insert (250) into a locking position; and
wherein by virtue of the displacement of the coupling member (270) along the tool longitudinal axis (D) towards the biasing spring (272), the ejector spring (222) is loosened, and the screw holder (221), the clamp screw (220) and the clamp (278) travel upwardly in a direction parallel to the insert pocket throughbore axis (E), disengaging the cutting insert (250) into a releasing position to allow removal and replacement of said cutting insert (250).

15. The cutting tool assembly (230) according to claim 14, wherein a protrusion (223) of the clamp (278) is inserted into the cutting insert throughbore (258) in the locking position, and is ejected from the cutting insert throughbore (258) in the releasing position.

16. The cutting tool assembly (330) according to claim 1, wherein the clamping element is a securing screw (378) accommodated in a securing screw holder (321) and an ejector spring (322).

17. The cutting tool assembly (330) according to claim 16, wherein by virtue of the displacement of the coupling member (370) along the tool longitudinal axis (F) in a direction away from the biasing spring (372), the securing screw holder (321) and as a result the securing screw (378) and the ejector spring (322) travel downwardly in a direction parallel to the insert pocket throughbore axis (G), engaging the cutting insert (350) into a locking position; and
wherein by virtue of the displacement of the coupling member (370) along the tool longitudinal axis (F) towards the biasing spring (372), the ejector spring (322) is loosened, the securing screw holder (321) and the securing screw (378) travel upwardly in a direction parallel to the insert pocket throughbore axis (G), disengaging the cutting insert (350) into a releasing position to allow removal and replacement of said cutting insert (350).

18. The cutting tool assembly (30, 230, 330) according to claim 1, wherein:
the rotatable cam member (68, 268, 368) is located in a through-hole (114) having a through-hole axis (T) which is transverse to the tool longitudinal axis (A, D, F); and
the rotatable cam member (68, 268, 368) is capable of being rotated from either end of the through-hole (114) to place the cutting insert in either the locking or releasing position.

19. A cutting tool assembly (30, 230, 330) comprising:
a tool body (32) having a longitudinal axis (A, D, F) extending in a forward to rearward direction and comprising:
an insert pocket (48, 248, 348) at a forward end thereof, the insert pocket having a cutting insert (50, 250, 350) removably secured therein; and
a through-hole (114) proximate the insert pocket, the through-hole extending along a through-hole axis (T) which is transverse to the tool longitudinal axis (A, D, F);
a rotatable cam member (68, 268, 368) positioned in the through-hole (114), and having a cam axis of rotation (C) and a first abutment surface (104, 304);
a biasing spring (72, 272, 372) extending along the tool longitudinal axis (A, D, F);
a clamping element (78, 278, 378); and
a coupling member (70, 270, 370) having a first portion (88, 288) configured to abut the first abutment surface (104, 304) of the rotatable cam member (68, 268, 368), a second portion (86) configured to abut the biasing spring (72, 272, 372), and a third portion (84, 284, 384) configured to cooperate with the clamping element (70, 270, 370) such that the clamping element engages the cutting insert (50, 250, 350) into a locking position or disengages the cutting insert into a releasing position, in response to rotation of the rotatable cam member (68, 268, 368);

wherein:

the rotatable cam member (68, 268, 368) is capable of being rotated from either end of the through-hole (114), to place the cutting insert in either the locking or releasing position;

rotation of the rotatable cam member (68, 268, 368) in a first direction about the cam axis of rotation (C) results in displacement of the coupling member (70, 270, 370) in a direction away from the biasing spring (72, 272, 372) along the tool longitudinal axis (A, D, F) and places the cutting insert in the locking position;

rotation of the rotatable cam member (68, 268, 368) in an opposite second direction about the cam axis of rotation (C) results in displacement of the coupling member (70, 270, 370) in a direction towards the biasing spring (72, 272, 372) along the tool longitudinal axis (A, D, F) and places the cutting insert in the releasing position.

20. The cutting tool assembly (30) according to claim 19, wherein:

the clamping element is a lever (78) which is L-shape in form and comprises a lever head portion (80) and a lever end portion (82); and in the locking position:

a front portion abutment surface (90) of the coupling member third portion (84) abuts an upper part (116) of the lever end portion (82), and applies a downward force along a direction which is transverse to the tool longitudinal axis (A) and also to the through-hole axis (T); and at least a portion of the lever (78) occupies an insert pocket throughbore (66) having an insert pocket throughbore axis (B) which is transverse to the tool longitudinal axis (A) and also to the through-hole axis (T).

21. The cutting tool assembly (230) according to claim 19, wherein:

the clamping element is a clamp (278) with a clamp screw (220) accommodated in a screw holder (221) and an ejector spring (222) positioned between the clamp (278) and the screw holder (221); and in the locking position:

a front portion abutment surface (290) of the coupling member third portion (284) abuts a top surface abutment portion (229) of the screw holder (221) and applies a downward force along a direction which is transverse to the tool longitudinal axis (A) and also to the through-hole axis (T); and the ejector spring (222) is compressed.

22. The cutting tool assembly (230) according to claim 19, wherein:

the clamping element is a securing screw (378) accommodated in a securing screw holder (321) and an ejector spring (322), the ejector spring (322) being positioned below the securing screw holder (321) away from the securing screw (378); and in the locking position:

a front portion abutment surface (390) of the coupling member third portion (384) abuts a top surface abutment portion (329) of the screw holder (321) and applies a downward force along a direction which is transverse to the tool longitudinal axis (A) and also to the through-hole axis (T); and the ejector spring (322) is compressed.

* * * * *